United States Patent
Diab

(10) Patent No.: US 8,565,269 B2
(45) Date of Patent: Oct. 22, 2013

(54) METHOD AND SYSTEM FOR MAC AND PHY SYNCHRONIZATION FOR ENERGY EFFICIENT NETWORKING

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 158 days.

(21) Appl. No.: 12/415,978

(22) Filed: Mar. 31, 2009

(65) Prior Publication Data

US 2009/0257457 A1  Oct. 15, 2009

Related U.S. Application Data

(60) Provisional application No. 61/045,203, filed on Apr. 15, 2008.

(51) Int. Cl.
*H04J 3/06* (2006.01)
(52) U.S. Cl.
USPC .......................................................... 370/503
(58) Field of Classification Search
USPC .................. 370/311, 503–520; 709/230–237; 713/320–324
See application file for complete search history.

(56) References Cited

U.S. PATENT DOCUMENTS

| 6,538,994 | B1 | 3/2003 | Horspool |
| 6,795,450 | B1 | 9/2004 | Mills et al. |
| 6,856,597 | B1 | 2/2005 | Scott |
| 6,952,399 | B1 | 10/2005 | Bayerl |
| 7,003,331 | B2 | 2/2006 | Cromer |
| 7,116,682 | B1 | 10/2006 | Waclawsky |
| 7,315,967 | B2 | 1/2008 | Azenko |
| 7,702,371 | B2 * | 4/2010 | Edwards et al. ............... 455/574 |
| 8,270,389 | B2 * | 9/2012 | Parnaby ......................... 370/350 |
| 2002/0016850 | A1 * | 2/2002 | Fritz et al. ..................... 709/232 |

(Continued)

FOREIGN PATENT DOCUMENTS

| EP | 1 473 870 | 11/2004 |
| EP | 1484876 | 12/2004 |

(Continued)

OTHER PUBLICATIONS

Teener, "AudioNideo Bridging for Home Networks (IEEE 802.1 AV Bridging Task Group)" [Online] Jun. 1, 2007, http://www.ieee802_org/3/eee_study/publiciju107/teener_1_0707.pdf.

(Continued)

*Primary Examiner* — Hoon J Chung
*Assistant Examiner* — Feben M Haile
(74) *Attorney, Agent, or Firm* — Duane S. Kobayashi

(57) ABSTRACT

Aspects of a method and system for MAC and PHY synchronization for energy efficient networking are provided. In this regard, an interface that enables communication between a MAC controller and a PHY device may be configured to operate in an energy saving mode. While the interface is operating in an energy saving mode, synchronization between the MAC controller and the PHY device may be maintained by one or both of adjusting a clock generated for the interface and/or communicating dummy data via the interface. The clock may be adjusted by one or more of adjusting a frequency of the clock, adjusting an amplitude of the clock, and/or duty cycling the clock. The MAC controller and/or the PHY device may generate the dummy data. The PHY device and/or the MAC controller may discard the dummy data upon receiving the dummy data.

15 Claims, 6 Drawing Sheets

(56) References Cited

U.S. PATENT DOCUMENTS

| | | | |
|---|---|---|---|
| 2002/0157030 A1* | 10/2002 | Barker et al. | 713/320 |
| 2002/0172274 A1 | 11/2002 | Carlson | |
| 2003/0226050 A1* | 12/2003 | Yik et al. | 713/324 |
| 2005/0188232 A1* | 8/2005 | Weng et al. | 713/320 |
| 2006/0034295 A1 | 2/2006 | Cherukuri et al. | |
| 2007/0132846 A1* | 6/2007 | Broad et al. | 348/143 |
| 2007/0280239 A1 | 12/2007 | Lund | |
| 2008/0123792 A1* | 5/2008 | Prete et al. | 375/362 |
| 2008/0225841 A1 | 9/2008 | Conway et al. | |
| 2008/0225879 A1* | 9/2008 | Powell | 370/445 |
| 2008/0273521 A1* | 11/2008 | Shao et al. | 370/350 |
| 2009/0204830 A1* | 8/2009 | Frid et al. | 713/322 |
| 2010/0110952 A1* | 5/2010 | Diab | 370/311 |

FOREIGN PATENT DOCUMENTS

| | | |
|---|---|---|
| EP | 1 494 407 | 1/2005 |
| GB | 2337672 | 11/1999 |
| GB | 2337672 A | 11/1999 |
| WO | WO 00/31923 | 6/2000 |
| WO | 2005104698 | 11/2005 |

OTHER PUBLICATIONS

Grow, "802.1 and Energy Efficient Ethernet." Sep. 11, 2007, pp. 1-6, XP002509616.

Bennett et al., "Energy Efficient Ethernet", [Online] IEEE 802 Tutorial, Jul. 16, 2007, http://www.ieee802.org/802_tutorials/july07/IEEE-tutorial-energy-efficient-ethernet.pdf.

Grow, "802.1 and Energy Efficient Ethernet", [Online] Sep. 11, 2007, pp. 1-6, http://www.ieee802.org/3/eee_study/public/sep07/grow_1_0907.pdf.

Teener, "AudioNideo Bridging for Home Networks (IEEE 802.1 Av Bridging Task Group)" [Online] Jun. 1, 2007, http://www.ieee802.org/3/eee_study/public/jul07/teener_1_0707.pdf.

Gupta et al., "Dynamic Ethernet Link Shutdown for Energy Conservation on Ethernet Links." IEEE, Jun. 24, 2007. XP002524616.

Wael Diab, "Energy Efficient Ethernet and 802.1." Nov. 2007. XP002524617.

* cited by examiner

US 8,565,269 B2

METHOD AND SYSTEM FOR MAC AND PHY SYNCHRONIZATION FOR ENERGY EFFICIENT NETWORKING

CROSS-REFERENCE TO RELATED APPLICATIONS/INCORPORATION BY REFERENCE

This patent application makes reference to, claims priority to and claims benefit from U.S. Provisional Patent Application Ser. No. 61/045,203, filed on Apr. 15, 2008.

The above stated application is hereby incorporated herein by reference in its entirety.

FIELD OF THE INVENTION

Certain embodiments of the invention relate to networking. More specifically, certain embodiments of the invention relate to a method and system for MAC and PHY synchronization for energy efficient networking.

BACKGROUND OF THE INVENTION

Communications networks and in particular Ethernet networks, are becoming an increasingly popular means of exchanging data of various types and sizes for a variety of applications. In this regard, Ethernet networks are increasingly being utilized to carry voice, data, and multimedia traffic. Accordingly more and more devices are being equipped to interface to Ethernet networks. Broadband connectivity including internet, cable, phone and VOIP offered by service providers has led to increased traffic and more recently, migration to Ethernet networking. Much of the demand for Ethernet connectivity is driven by a shift to electronic lifestyles involving desktop computers, laptop computers, and various handheld devices such as smart phones and PDA's. Applications such as search engines, reservation systems and video on demand that may be offered at all hours of a day and seven days a week, have become increasingly popular.

These recent developments have led to increased demand on datacenters, aggregation, high performance computing (HPC) and core networking. As the number of devices connected to data networks increases and higher data rates are required, there is a growing need for new transmission technologies which enable higher data rates. Conventionally, however, increased data rates often results in significant increases in power consumption. In this regard, as an increasing number of portable and/or handheld devices are enabled for Ethernet communications, battery life may be a concern when communicating over Ethernet networks. Accordingly, ways of reducing power consumption when communicating over Ethernet networks may be needed.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for MAC and PHY synchronization for energy efficient networking, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for MAC and PHY synchronization for energy efficient networking. In various embodiments of the invention, an interface that enables communication between a MAC controller and a PHY device may be configured to operate in an energy saving mode. While the interface is operating in an energy saving mode, synchronization between the MAC controller and the PHY device may be maintained by one or both of adjusting a clock generated for the interface and/or communicating dummy data via the interface. The clock may be adjusted by one or more of adjusting a frequency of the clock, adjusting an amplitude of the clock, and/or duty cycling the clock. The clock may be adjusted periodically or aperiodically over one or more time intervals. The interface may be configured to operate in an energy saving mode at times determined by one or both of a rate at which data is to be communicated by the interface and/or an amount of data to be communicated by the interface. The amount of data to be communicated by the interface may be determined based on a status of one or more queues in the PHY device and/or the MAC controller. The interface may exit an energy saving mode when the interface receives data from the MAC controller and/or when the interface receives data from the PHY device. The MAC controller and/or the PHY device may generate the dummy data. The PHY device and/or the MAC controller may discard the dummy data upon receiving the dummy data.

Figure 1A:
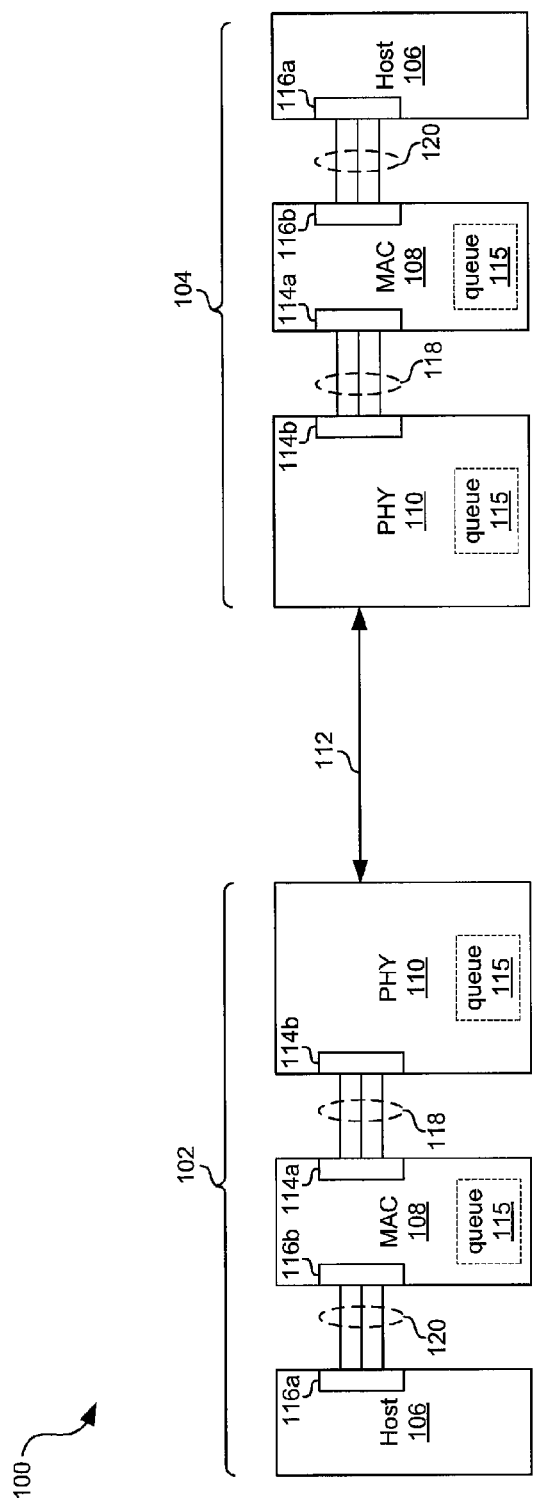
FIG. 1A is a block diagram illustrating an exemplary Ethernet connection between two network devices, in accordance with an embodiment of the invention.

FIG. 1A is a block diagram illustrating an exemplary Ethernet connection between a two network devices, in accordance with an embodiment of the invention. Referring to FIG.

1A, there is shown a system 100 that comprises a network device 102 and a network device 104. The network devices 102 and 104 may each comprise a host 106, a media access control (MAC) controller 108, and a PHY device 110. The hosts 106 may be communicatively coupled to the MAC controllers 108 via interfaces 116a and 116b. The MAC controllers 108 may be communicatively coupled to the PHY devices 110 via interfaces 114a and 114b.

The network devices 102 and 104 may be link partners that communicate via the link 112. The network device 102 and/or 104 may comprise, for example, computer systems or audio/video (A/V) enabled equipment. In this regard, A/V equipment may, for example, comprise a microphone, an instrument, a sound board, a sound card, a video camera, a media player, a graphics card, or other audio and/or video device. Additionally, the network devices 102 and 104 may be enabled to utilize Audio/Video Bridging and/or Audio/video bridging extensions (collectively referred to herein as audio video bridging or AVB) for the exchange of multimedia content and associated control and/or auxiliary data.

The hosts 106 may each comprise suitable logic, circuitry, interfaces, and/or code that may enable operability and/or functionality of OSI layers 7 through 3 for packets received and/or to-be-transmitted over the link 112. The hosts 106 may each comprise, for example, one or more processing subsystems, one or more graphics subsystems, one or more audio subsystems, and one or data buses. The hosts 106 may comprise an interface 116a for communicating with a MAC controller 108 via a bus 120. The data bus 120 may, for example, be a PCI or PCI-X bus.

The MAC controllers 108 may comprise suitable logic, circuitry, interfaces, and/or code that may enable handling of data link layer, OSI layer 2, operability and/or functionality. The MAC controllers 108 may, for example, be configured to implement Ethernet protocols, such as those based on the IEEE 802.3 standard, for example. Since each layer in the OSI model provides a service to the immediately higher interfacing layer, the MAC controllers 108 may provide the necessary services to the hosts 106 to ensure that packets are suitably formatted and communicated to the PHY devices 110. The MAC controllers 108 may each comprise an interface 116b for communicating with a host 106 via the bus 120. Also, the MAC controllers 108 may comprise one or more memory elements 115 for queuing received data and/or to-be-transmitted data.

Each of the MAC controllers 108 may also comprise an interface 114a for communicating with a PHY device 110 via a bus 118. The interface 114a may be, for example, a multi-rate capable interface and/or media independent interface (MII). The interface 114a may enable transmission and/or reception of one or more data signals and one or more clock signals over the bus 118.

The PHY devices 110 may each comprise suitable logic, circuitry, interfaces, and/or code that may enable communication, for example, transmission and reception of data, between the network device 102 and the network device 104 and may also be operable to implement one or more energy efficient networking (EEN) techniques. Each of the PHY devices 110 may be referred to as a physical layer transmitter and/or receiver, a physical layer transceiver, a PHY transceiver, a PHYceiver, or simply a PHY. Each of the PHY devices 110 may comprise an interface 114b for communicating with a MAC controller 108 via the bus 118. The interface 114b may be, for example, a multi-rate capable interface and/or media independent interface (MII). The interface 114b may enable transmission and/or reception of one or more data signals and one or more clock signals over the bus 118. Also, the PHY devices 110 may comprise one or more memory elements 115 for queuing received data and/or to-be-transmitted data.

Each of the PHY devices 110 may be operable to implement one or more energy efficient networking (EEN) techniques. For example, the PHY devices 110 may be operable to support low power idle (LPI) and/or sub-rating, also referred to as subset PHY, techniques. LPI may generally refer a family of techniques where, instead of transmitting conventional IDLE symbols during periods of inactivity, the PHY devices 110 may remain silent and/or communicate signals other than conventional IDLE symbols. Sub-rating, or sub-set PHY, may generally refer to a family of techniques where the PHYs are reconfigurable, in real-time or near real-time, to communicate at different data rates.

The Ethernet link 112 is not limited to any specific medium. Exemplary Ethernet link 112 media may comprise copper, optical and/or backplane technologies. For example, a copper medium such as STP, Cat3, Cat 5, Cat 5e, Cat 6, Cat 7 and/or Cat 7a as well as ISO nomenclature variants may be utilized. Additionally, copper media technologies such as InfiniBand, Ribbon, and backplane may be utilized. With regard to optical media for the Ethernet link 112, single mode fiber as well as multi-mode fiber may be utilized. The link 112 may comprise up to four or more physical channels, each of which may, for example, comprise an unshielded twisted pair (UTP). The network device 102 and the network device 104 may communicate via two or more physical channels comprising the link 112. For example, Ethernet over twisted pair standards 10BASE-T and 100BASE-TX may utilize two pairs of UTP while Ethernet over twisted pair standards 1000BASE-T and 10GBASE-T may utilize four pairs of UTP. In this regard, however, the number of physical channels via which data is communicated may vary.

In operation, a bitstream may be communicated between the MAC 108 and the PHY 110 via the bus 118 and interfaces 114a and 114b. Nonetheless, there may, at times, be little or no data being communicated and/or to-be-communicated over the bus 118. During such periods of low utilization, an energy efficient networking (EEN) control policy may reconfigure one or both of the interfaces 114a and 114b into an energy saving mode. In this regard, because the interfaces 114a and 114b may consume substantial amounts of energy even when they are not sending or receiving data, it may be desirable to power down the interfaces during such times. The interfaces may be configured based on an amount of data to be communicated by the interface, a rate at which the data is to be communicated by the interface, and/or an acceptable latency of data communicated by the interface. The amount of data may be determined, for example, based on a state of one or more queues in the PHY device 110 and/or the MAC controller 108. The rate at which the data is to be communicated may be determined, for example, based on a standard selected during autonegotation and/or selected by an energy efficient networking control policy.

Powering down an interface 114a and/or 114b may, however, be problematic because the interfaces may comprise logic, circuitry, and/or code that may depend on one or more active clock signals to maintain frequency and/or phase lock. Accordingly, if such clock signals are powered down, the amount of time required for the interfaces 114a and 114b to achieve phase and/or frequency lock may introduce prohibitive delays when attempting to power up the interfaces to send data. Moreover, when additional interfaces are cascaded, e.g., when extenders such as XAUI and/or XIF are utilized, the delays in re-establishing communications between a series of multiple interfaces 114a and 114b may be cumulative and may make powering down the clock(s) even more problematic. Accordingly, aspects of the invention may enable reducing power consumption of one or both of the interfaces 114a and 114b while reducing the time required to power up the interfaces and achieve frequency and/or phase lock.

In one exemplary embodiment of the invention, a clock signal communicated over the bus 118 may continue uninterrupted while other portions of the interface 114a and/or 114b are powered down or operated in an energy saving mode. In this regard, logic, circuitry, and/or code associated with communicating data over the bus 108 may be powered down while logic, circuitry, and/or code associated with generating the clock signal may remain powered up.

In another exemplary embodiment of the invention, an energy saving clock signal may be communicated over the bus 118 during time periods that one there is little or no data to communicate over the bus 118. In this regard, portions of the interfaces 114a and/or 114b, MAC 108a, and/or PHY 110a associated with generating a clock signal on the bus 118 may be operated in an energy saving mode but may remain sufficiently operable to generate an energy saving clock signal. The energy saving clock signal may be reduced in frequency and/or amplitude compared to the conventional clock signal generated while there is data to be communicated over the bus 118. For example, the frequency may be divided down or an alternate clock may be utilized while one or both interfaces 114a and 114b are operating in an energy saving mode. Also, the clock signal may be generated, at a conventional frequency and/or amplitude, and/or a reduced frequency and/or amplitude, during a portion of a time interval and may not be generated for a remaining portion of a time interval.

In another exemplary embodiment of the invention, one or both of the interfaces 114a and 114 may be powered down during a portion of a time interval and may be powered up for a remaining portion of a time interval. The interfaces may occasionally "wake up", generate signals to maintain frequency and/or phase lock, and then return to an energy saving mode. In this regard, a MAC controller 108 may be operable to occasionally convey "dummy" data to the interface 114a to cause the interface 114a to exit an energy saving state and generate a clock signal. Accordingly, the interface 114b may detect the clock signal and may exit an energy saving mode re-synchronize to the interface 114b. The "dummy" data may serve no purpose other than to wake up and synchronize the interfaces 114a and 114b and may thus be dropped by the PHY 110. Similarly, a PHY device 110 may be operable to occasionally convey "dummy" data to the interface 114b to cause the interface 114b to come out of an energy saving state and generate a clock signal. Accordingly, the interface 114a may be operable to detect the clock signal and may come out of an energy saving mode re-synchronize to the interface 114a. The "dummy" data may serve no purpose other than to wake up and synchronize the interfaces 114a and 114b and may thus be dropped by the MAC controller 108.

In some instances the MAC 108 may be a legacy device and may not support EEN. In such instances, portions of the PHY 110a and/or interface 114b may be powered down and/or operated in an energy saving mode transparently to the MAC 108. In this regard, the PHY device 110 and/or interface 114b may be reconfigured into an energy saving mode that retains minimum functionality to keep the legacy MAC 108 from erroneously detecting an error or problem with the PHY device 110. While the EEN PHY 110 is operating in an energy saving mode, it may disregard unneeded and/or legacy signals from the legacy MAC 108. Also, the EEN PHY 110 may occasionally generate and convey "dummy" packets to the legacy MAC 108.

In some instances, waking up the interfaces 114a and 114b may require additional time from waking up other portions of the network devices. In such instances, the additional time to power up the interfaces 114a and 114b may be communicated to a link partner via packets communicated over the link 112 and/or utilizing some low-complexity physical layer signaling. For example, the additional time necessary may be communicated to a link partner utilizing link layer discovery protocol (LLDP) data units. Such LLDP communication may utilized one or more state machines to ensure communicated information is not stale.

In various embodiments of the invention, a mode of operation of the interfaces 114a and 114b may be controlled via physical layer signaling and or packet communicated over the link 112. In this regard, the control signals and/or packets may be communicated in-band and/or out-of-band with data communicated on the link. Out-of-band control signals and/or packets may be communicated via a reserved channel. the control signals may configure one or more registers that may determine a mode of operation of the interfaces 114a and 114b.

Figure 1B:
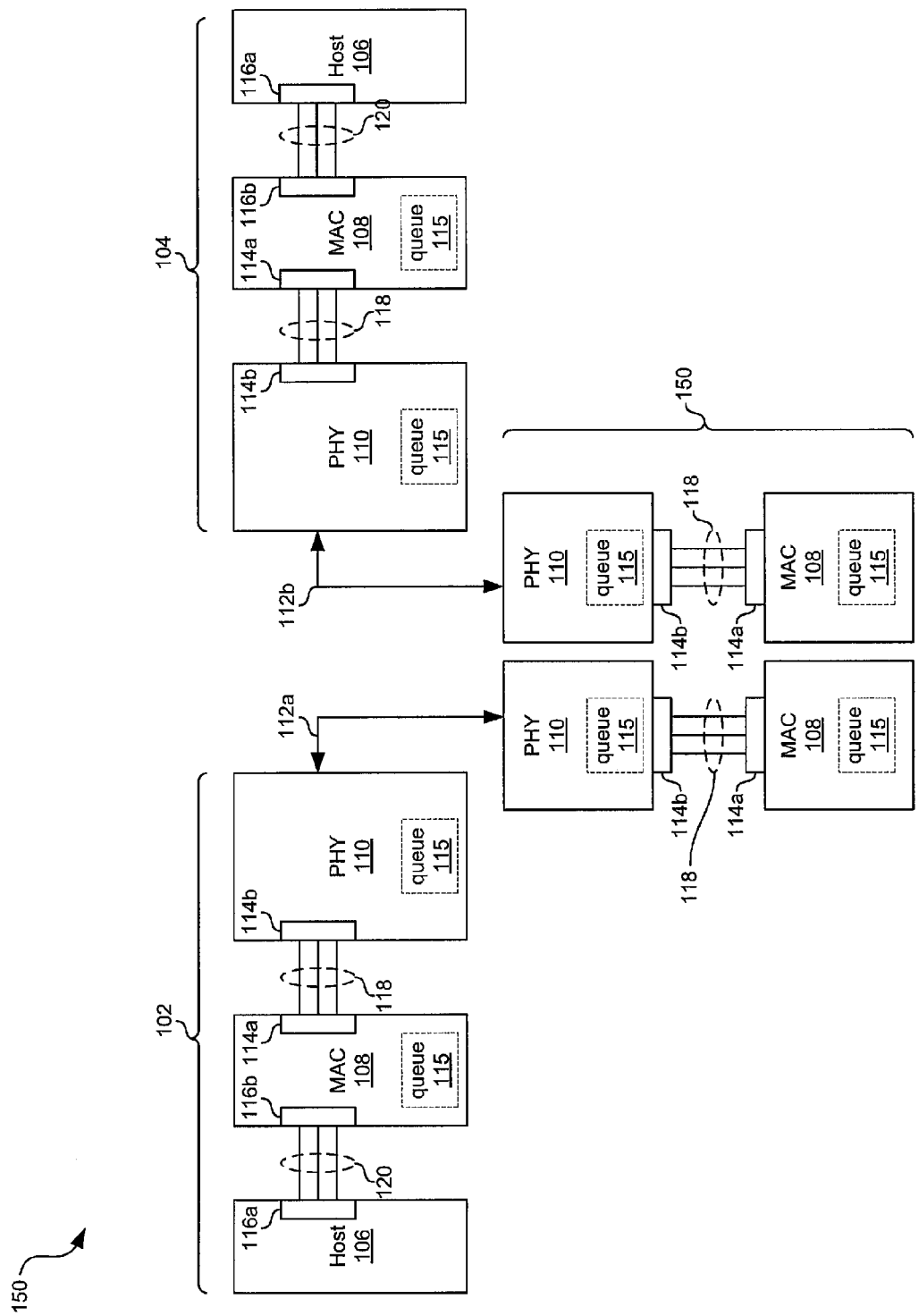
FIG. 1B is a diagram illustrating exemplary network devices communicatively coupled via a core device, in accordance with an embodiment of the invention.

FIG. 1B is a diagram illustrating exemplary network devices communicatively coupled via a core device, in accordance with an embodiment of the invention. Referring to FIG. 1B, there is shown the network devices 102 and 104 described with respect to FIG. 1A and there is shown a core network device 150. The network devices 102 and 104 may be communicatively coupled via the links 112a and 112b, each of which may be the same as the link 112 described with respect to FIG. 1A.

The core network device 150 may comprise suitable logic, circuitry, interfaces, and/or code operable to receive and transmit packets via the links 112a and 112b and additionally to implement an EEN policy. The core network device may be, for example, a router, a switch, bridge, or a hub. The device 150 may comprise a plurality of MACs 108 and a PHYs 110 which may in turn comprise interfaces 114a and 114b, all of which may be as described with respect to FIG. 1. In this regard, the core network device 150 may comprise a MAC 108, PHY 110, and an interface 114 for each of N network ports, where N may be an integer. Accordingly, the core network device may be enabled to manage power consumption of up to N interfaces 114a and 114b.

In operation, aspects of the invention may be utilized to manage power consumption of the interfaces 114a and 114b within the device 150. The MAC controller 108, PHY device 110, and interfaces 114a and 114b may be operable to implement some or all of the aspects of the invention described with respect to the devices 102 and 104 in FIG. 1A. In various exemplary embodiments of the invention, one or more clocks associated with the interfaces 114a and 114b may be slowed down based on the amount of data communicated and/or to-be-communicated between the devices 102 and 104. For example, the interfaces 114a and 114b may be slowed down when one or both of the network devices 102 and are operating in an energy saving mode.

The network 150 of FIG. 1B illustrates the benefits of various aspects of the invention. For example, as data is communicated from the device 102 to the device 150 and then to the device 104, the data may traverse three of the busses 118. That is, any delay in waking up the interfaces 114a and 114b may be multiplied by a factor of 3. Accordingly, reducing even small delays in waking up the interfaces 114a and 114b may prevent large delays that accumulate over a network path.

Figure 2:
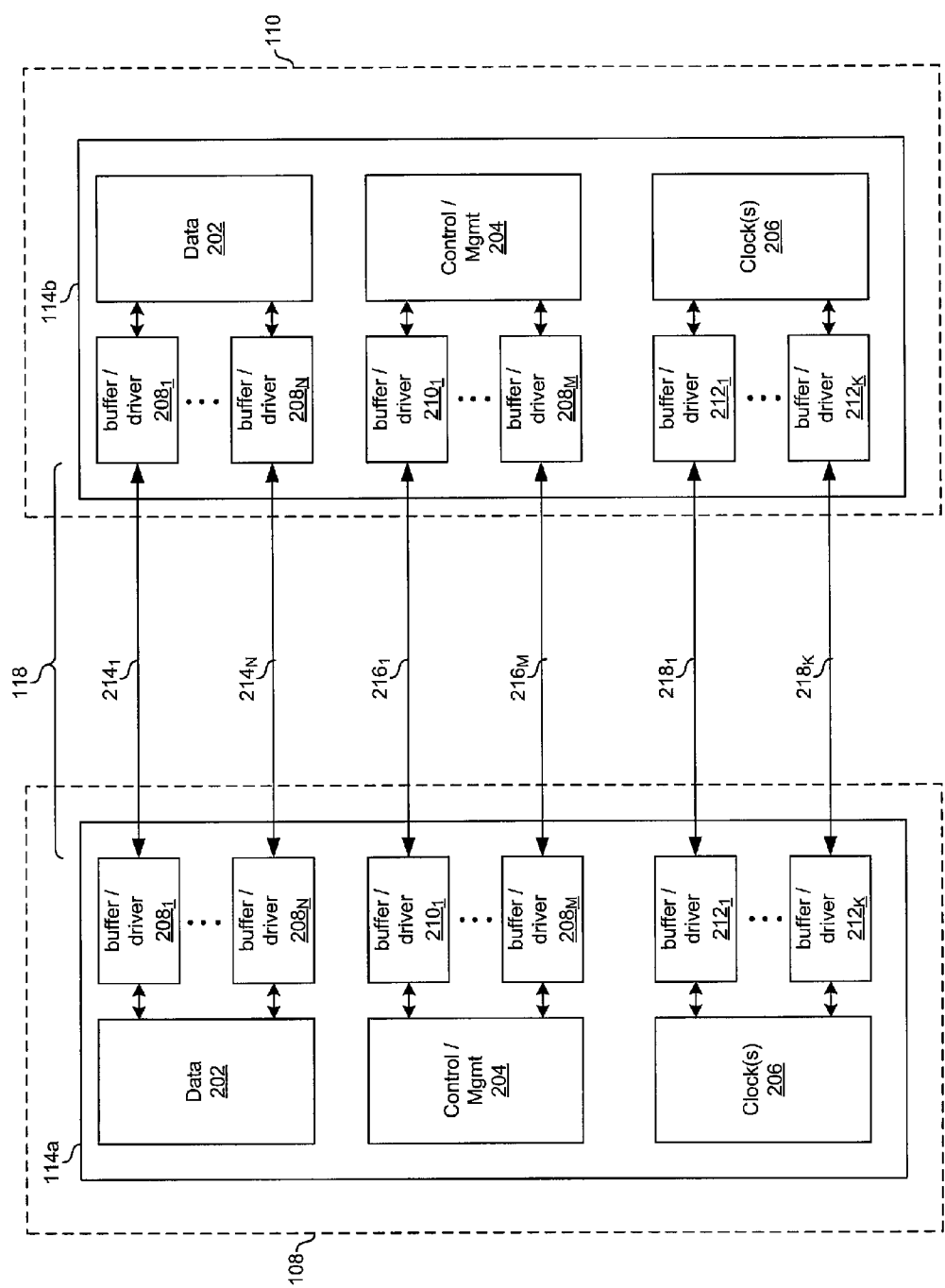
FIG. 2 is a diagram illustrating an exemplary MAC/PHY interface that supports energy efficient networking, in accordance with an embodiment of the invention.

FIG. 2 is a diagram illustrating an exemplary MAC/PHY interface that supports energy efficient networking, in accordance with an embodiment of the invention. Referring to FIG. 2, there is shown the interfaces 114a and 114b described with respect to FIGS. 1A and 1B. Each of the interfaces 114a and 114b may comprise a data processing module 202, a control and/or management (Ctrl/Mgmt) module 204, a clock module 206, and a plurality of buffers and/or line drivers (buffers/drivers) $208_1, \ldots, 208_N, 210_1, \ldots, 210_M,$ and $212_1, \ldots, 212_K$. The interfaces are described in generic terms to represent common functions implemented by various interface standards. Exemplary standards utilized and/or implemented by the interfaces 114 may comprise MII, RMII, GMII, RGMII, SGMII, XGMII, XAUI, and XFI. Additionally, the interfaces 114a and/or 114b may comprise and/or utilize a management interfaces such as a management data input output (MDIO) bus.

Each of the data processing modules 202 may comprise suitable logic, circuitry, interfaces, and/or code that may be operable to process data received from the MAC controller 108 to make the data suitable for conveyance to the buffers/drivers $208_1, \ldots, 208_N$, where N is an integer. Similarly, the data processing modules 202 may be operable to process data received from the buffers/drivers $208_1, \ldots, 208_N$ to make the data suitable for conveyance to the MAC controller 108. Exemplary operations performed by the module 202 may comprise multiplexing, demultiplexing, serialization, and deserialization of data. In some embodiments of the invention, a data module 202 may be operable to generate "dummy" data and convey that data to the buffers/drivers $208_1, \ldots, 208_N$. Similarly, the a module 202 may be operable to recognize and discard dummy received from the buffers/drivers $208_1, \ldots, 208_N$ data without passing the data onto the MAC controller 108 and/or higher OSI layers. Data may be communicated between data modules 202 via the buffers/drivers $208_1, \ldots, 208_N$ and the signal lines $214_1, \ldots, 214_N$ of the bus 118. In this regard, bits of data may be communicated over the bus 118 serially or in parallel. Although the data processing modules 202 are illustrated as being within the interfaces 114a and 114b, such a physical boundary may not actually exist in a particular implementation because portions of the module 202 may be shared between MAC controller functions and interface functions or between PHY functions and interface functions.

Each of the Ctrl/Mgmt processing modules 204 may comprise suitable logic, circuitry, interfaces, and/or code that may be operable to generate and/or process maintenance and/or control information. In various exemplary embodiments of the invention, the Ctrl/Mgmt processing modules 204 may each be operable to read and/or write one or more configuration registers in a PHY device 110. Control and/or management information may be communicated via signal lines $216_1, \ldots, 216_M$. For example, a single line $216_1$ may be utilized to read and/or write MDIO registers. In various embodiments of the invention, a Ctrl/Mgmt processing module 204 may be operable to communicate information for implementing EEN techniques and/or protocols. In this regard, a Ctrl/Mgmt module 204 may be operable to generate signals to trigger synchronization of the interfaces 114a and 114b. Also, a Ctrl/Mgmt module 204 may be operable to generate signals to trigger a MAC controller 108 and/or PHY 110 to transition into and/or out of an energy saving mode of operation. Although the Ctrl/Mgmt processing modules 204 are illustrated as being within the interfaces 114a and 114b, such a physical boundary may not actually exist in a particular implementation because portions of the module 204 may be shared between MAC functions and interface functions or between PHY functions and interface functions.

Each of the clock modules 206 may comprise suitable logic, circuitry, interfaces, and/or code that may be operable generate one or more clock signals on clock lines $218_1, \ldots, 218_K$, where K is an integer. In various embodiments of the invention, one or more generated clock signals may be utilized for one or more of transmission of data, reception of data, transmission of ctrl/mgmt signals, and reception of ctrl/mgmt signals. In various embodiments of the invention, a clock module 206 may be operable to generate different clock frequencies for different standards and/or data rates utilized by a PHY 110 device. For example, the clock module 206 may generate a 2.5 MHz clock when a PHY 110 utilizes a 10 Mb standard such as 10BASE-T, a 25 MHz clock when a PHY utilizes a 100 Mb standard such as 100BASE-T, and a 125 MHz clock when a PHY 110 utilizes a 1 Gb standard 1GBASE-T. Accordingly, aspects of the invention may enable a clock frequency conventionally utilized for a lower standard data rate to be utilized in instances when the interface is operating in an energy saving mode. To illustrate, a PHY 110 may negotiate a data rate of 1 Gbps with a link partner and the clock module 206 may generate a 1.25 GHz clock when operating in a normal mode but may generate a 2.5 MHz or 25 MHz clock when operating in LPI mode. In this regard, switching to a lower frequency clock may enable maintaining phase and/or frequency lock between the interfaces 114a and 114b while significantly reducing energy consumption in the interfaces 114a and 114b and on the clock lines $218_1, \ldots, 218_K$.

The buffers/drivers $208_1, \ldots, 208_N$ may comprise suitable logic, circuitry, interfaces, and/or code that may be operable to transmit and receive signals via the data lines $214_1, \ldots, 214_N$. The buffers/drivers $210_1, \ldots, 210_M$ may comprise suitable logic, circuitry, interfaces, and/or code that may be operable to transmit and receive signals via the Ctrl/Mgmt lines $216_1, \ldots, 216_M$. The buffers/drivers $212_1, \ldots, 212_K$ may comprise suitable logic, circuitry, interfaces, and/or code that may be operable to transmit and receive signals via the clock lines $218_1, \ldots, 218_K$.

In operation, a transmit clock may clock data into the data module 202, clock the data out of the module 202 into the buffers/drivers $208_1, \ldots, 212_N$, and clock the data out of the buffers/drivers $208_1, \ldots, 212_N$ onto the data lines $214_1, \ldots, 214_N$. In instances that there may be no data to transmit across the data lines, transmit portions of the data module 202, transmit portions of the buffers/drivers $208_1, \ldots, 212_N$ may be powered down or reconfigured, and a transmit clock generated by the module 206 may be stopped or reduced in frequency or amplitude. Furthermore, the transmit clock may be stopped and occasionally restarted to maintain phase and/or frequency lock between the interfaces 114a and 114b. Also, the buffers/drivers $208_1, \ldots, 212_N$ may be reconfigured to adjust the amplitude of the transmit clock signal. In this regard, when there is no data on the data lines $214_1, \ldots, 214_N$, noise may be less of an issue and a lower transmit clock amplitude may be tolerated.

Similarly, a receive clock on one or more of the clock lines $218_1, \ldots, 218_K$ may clock data into the buffers/drivers $208_1, \ldots, 208_N$ from the data lines $214_1, \ldots, 214_N$, clock the data out of the buffers/drivers $208_1, \ldots, 208_N$ into the data module 202, and clock the data out of the module 202 to higher OSI layers. In instances when there may be no data to receive via the data lines, receive portions of the data module 202, receive portions of the buffers/drivers $208_1, \ldots, 208_N$ may be powered down or reconfigured, and a receive clock generated by the module 206 may be stopped or reduced in frequency or amplitude. Furthermore, the receive clock may be stopped and occasionally restarted to maintain phase and/ or frequency lock between the interfaces 114a and 114b. Also, the buffers/drivers $208_1, \ldots, 208_N$ may be reconfigured to adjust the amplitude of the receive clock signal. In this regard, when there is no data on the data lines $214_1, \ldots, 214_N$, noise may be less of an issue and a lower receive clock amplitude may be tolerated.

In some instances, the receive clock may be recovered from received data. Accordingly, "dummy" data may be occasionally generated by the data module 202 and conveyed over the data lines $214_1, \ldots, 214_N$ to enable frequency and/or phase locking the interfaces 114a and 114b.

Figure 3A:
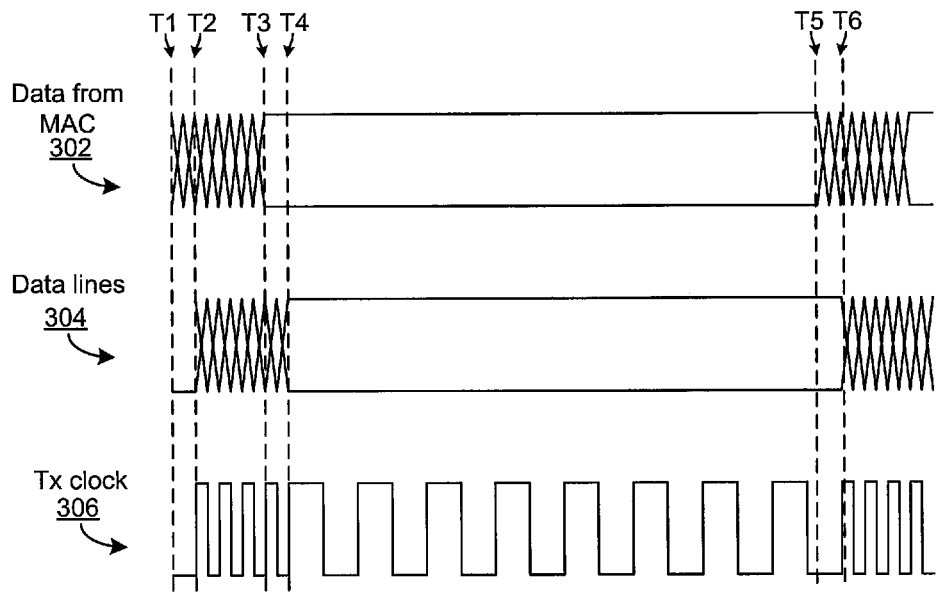
FIG. 3A is a timing diagram illustrating a EEN enabled MAC/PHY interface that maintains synchronization by utilizing a reduced clock frequency, in accordance with an embodiment of the invention.

FIG. 3A is a timing diagram illustrating a EEN enabled MAC/PHY interface that maintains synchronization by utilizing a reduced clock frequency, in accordance with an embodiment of the invention. Referring to FIG. 3A, the waveform 302 shows data arriving at an interface. Also shown are waveforms 304 and 306 show that data being clocked onto the data lines $212_1, \ldots, 212_N$. In this regard, the waveform 302 may represent data arriving ay an interface 114a from a MAC 108 or at an interface 114b from a PHY 110.

From time instant T1 until time instant T2, data may be arriving at the interface, and may be clocked into and processed by the data module 202. This delay between the time instants T1 and T2 may include time required to process the data as well time to wake up the interface. Accordingly, the data may need to be queued from the time instant T1 to the time instant T2.

At the time instant T2, the processed data may start being clocked onto the data lines $214_1, \ldots, 214_N$. At time instant T3, the data may cease arriving at the interface. At time instant T4, the interface may finish clocking the data onto the data lines $214_1, \ldots, 214_N$. From the time instant T3 until time instant T5, there may be no data for the interface to transmit and thus one or more portions of the interface may be put into an energy saving mode of operation. Accordingly, from the time instant T4 to time instant T6, the transmit clock may be reduced in frequency.

At the time instant T5, the interface may again begin receiving data. From the time instant T5 to time instant T6, the interface may come out of the energy saving mode of operation. In this manner, by maintaining synchronization via a reduced frequency clock during the time interval between the time instants T4 and T5, the intervals from the time instant T1 to the time instant T2 and from the time instant T5 to the time instant T6 may be relatively short enough to prevent the introduction of prohibitively large path delays, even when the path comprises a plurality of EEN enabled MAC/PHY interfaces.

Figure 3B:
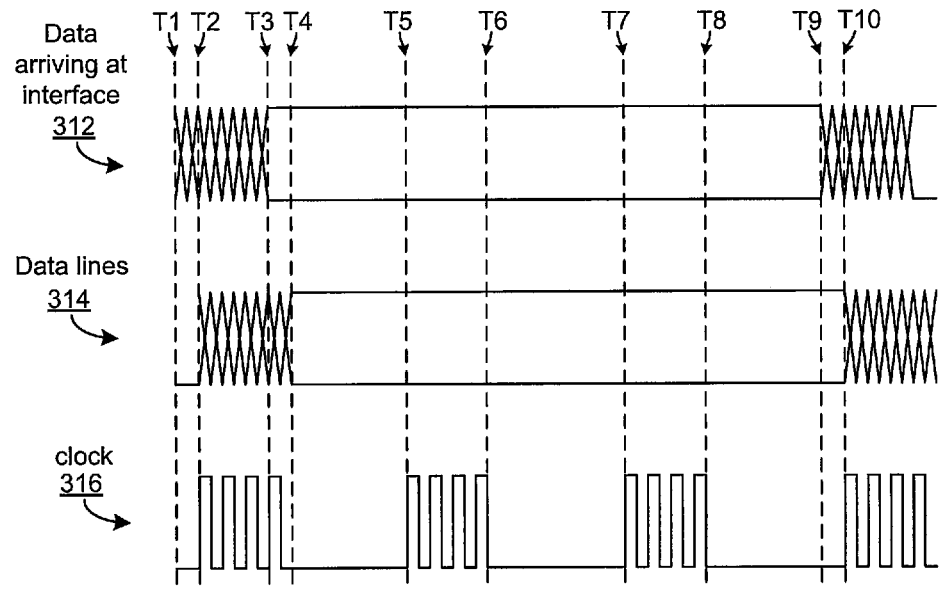
FIG. 3B is a timing diagram illustrating an EEN enabled MAC/PHY interface that maintains synchronization by occasionally or periodically enabling a clock signal, in accordance with an embodiment of the invention.

FIG. 3B is a timing diagram illustrating an EEN enabled MAC/PHY interface that maintains synchronization by occasionally or periodically enabling a clock signal, in accordance with an embodiment of the invention. Referring to FIG. 3B, waveform 312 shows data arriving at a MAC/PHY interface and waveforms 314 and 316 show that data being clocked onto the data lines $214_1, \ldots, 214_N$. In this regard, the waveform 312 may represent data arriving at an interface 114a from a MAC 108 or at an interface 114b from a PHY 110.

From time instant T1 until time instant T2, data may be arriving at the interface, and may be clocked into and processed by the data module 202. This delay between the time instants T1 and T2 may include time required to process the data as well time to wake up the interface. Accordingly, the data may need to be queued from the time instant T1 to time instant T2.

At the time instant T2, the processed data may start being clocked onto the data lines $212_1, \ldots, 212_N$. At time instant T3, the data may cease arriving at the interface. At time instant T4, the interface may finish clocking the data onto the data lines $212_1, \ldots, 212_N$. From the time instant T3 until the time instant T9, there may be no data for the interface to transmit and thus one or more portions of the interface may be put into an energy saving mode of operation. Accordingly, from the time instant T4 to time instant T9, the clock may be shut down and occasionally or periodically restarted to maintain synchronization. In this regard, the clock may be restarted from time instant T5 to time instant T6 and from time instant T7 to time instant T8.

From the time instant T9 to time instant T10, the MAC/PHY interface may again begin receiving data from the MAC and may come out of the energy saving mode of operation. In this manner, because occasionally re-enabling the clock may maintain synchronization and reduce wake-up time, the intervals from the time instant T1 to the time instant T2 and from the time instant T9 to the time instant T10 may be relatively short enough to prevent the introduction of prohibitively large path delays, even when the path comprises a plurality of EEN enabled MAC/PHY interfaces.

Figure 3C:
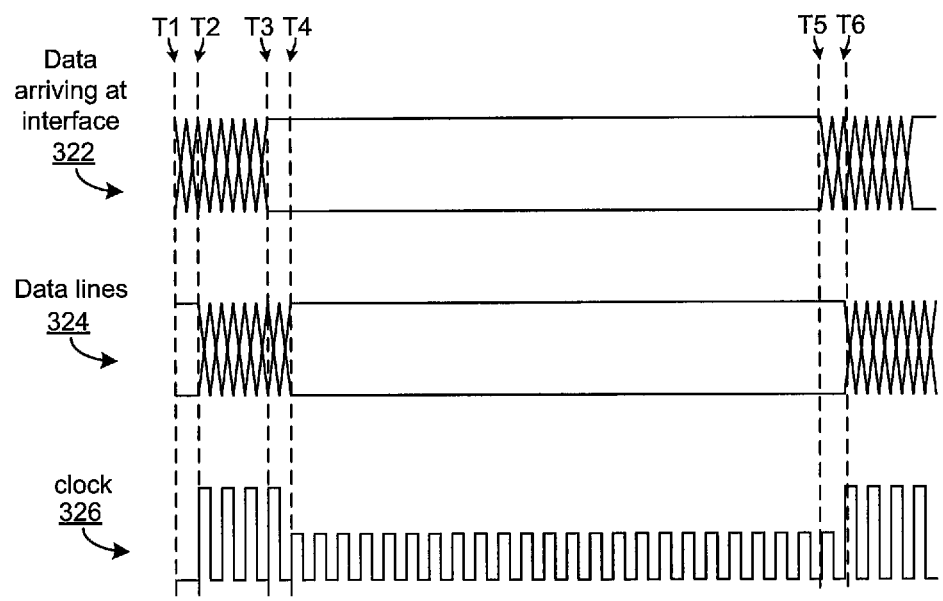
FIG. 3C is a timing diagram illustrating an EEN enabled MAC/PHY interface that maintains synchronization by occasionally or periodically enabling a clock signal, in accordance with an embodiment of the invention.

FIG. 3C is a timing diagram illustrating an EEN enabled MAC/PHY interface that maintains synchronization by occasionally or periodically enabling a clock signal, in accordance with an embodiment of the invention. Referring to FIG. 3C waveform 322 shows data arriving at an interface and waveforms 324 and 326 show that data being clocked onto the data lines $212_1, \ldots, 212_N$. In this regard, the waveform 322 may represent data arriving at an interface 114a from a MAC 108 or at an interface 114b from a PHY 110.

From time instant T1 until time instant T2, data may be arriving at the interface, and may be clocked into and processed by the data module 202. This delay between the time instants T1 and T2 may include time required to process the data as well time to wake up the interface. Accordingly, the data may need to be queued from the time instant T1 to the time instant T2.

At the time instant T2, the processed data may start being clocked onto the data lines $212_1, \ldots, 212_N$. At time instant T3, the data may cease arriving at the interface. At time instant T4, the interface may finish clocking the data onto the data lines $212_1, \ldots, 212_N$. From the time instant T3 until time instant T5, there may be no data for the interface to transmit and thus one or more portions of the interface may be put into an energy saving mode of operation. Accordingly, from the time instant T4 to time instant T6, the transmit clock may be reduced in amplitude.

From the time instant T5 to the time instant T6, the interface may again begin receiving data and may come out of the energy saving mode of operation. In this manner, by maintaining synchronization via a reduced amplitude clock during the time interval between the time instants T4 and T5, the intervals between the time instants T1 and T2 and between the time instants T5 and T6 may be relatively short enough to prevent the introduction of prohibitively large path delays, even when the path comprises a plurality of EEN enabled MAC/PHY interfaces.

Figure 3D:
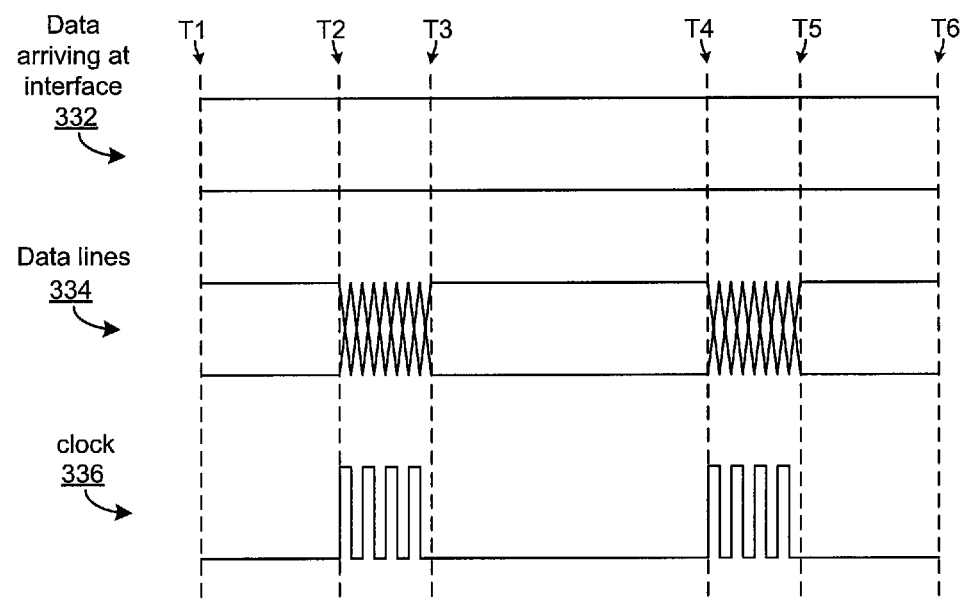
FIG. 3D is a timing diagram illustrating an EEN enabled MAC/PHY interface that maintains synchronization by aperiodically or periodically communicating dummy data, in accordance with an embodiment of the invention.

FIG. 3D is a timing diagram illustrating an EEN enabled MAC/PHY interface that maintains synchronization by occasionally or periodically communicating dummy data, in accordance with an embodiment of the invention. Referring to FIG. 3D waveform 332 shows a period where no data is arriving at an interface 114a or 114b and waveforms 334 and 336 illustrate maintaining synchronization between the MAC and PHY by clocking dummy data onto the data lines $212_1, \ldots, 212_N$.

From time instant T1 until time instant T6 there may be no data arriving at either the interface 114a or the interface 114b. Accordingly, during the intervals from time instant T2 to time instant T3 and from time instant T4 to time instant T5 dummy data may be generated by the MAC 108 or the PHY 110 and clocked onto the data lines $212_1, \ldots, 212_N$. In this manner, the dummy data may cause one or more transmit and/or receive clocks to start-up and the MAC and PHY may be resynchronized.

In this manner one or more clocks generated for an interface 14a and/or 114b may be duty cycled between a plurality of frequencies. In the exemplary waveform depicted, the clock is duty cycled between is normal frequency and a zero frequency.

Figure 4:
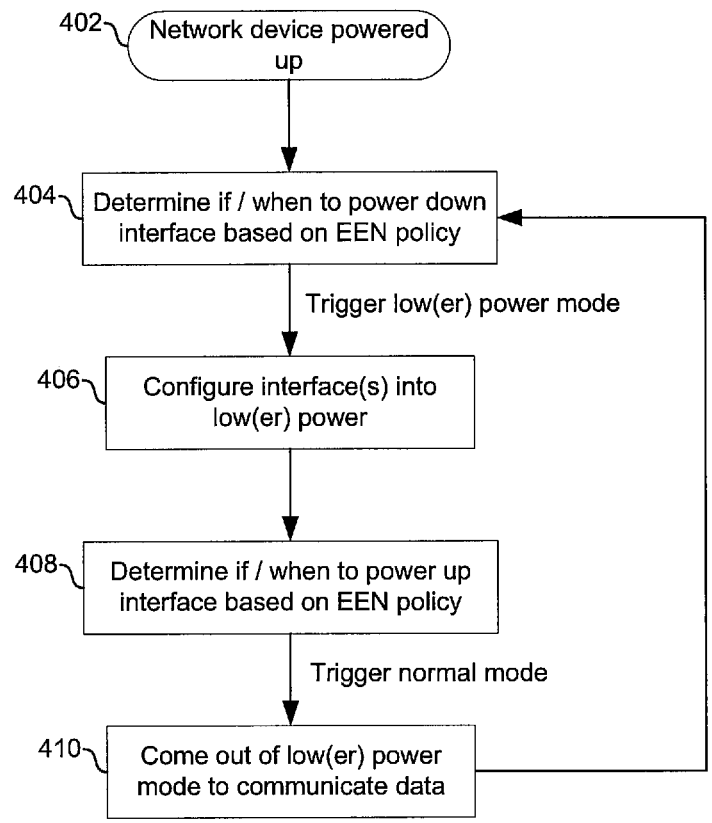
FIG. 4 is a flow chart illustrating exemplary steps for reducing power consumption of a MAC/PHY interface, in accordance with an embodiment of the invention.

FIG. 4 is a flow chart illustrating exemplary steps for reducing power consumption of a MAC/PHY interface, in accordance with an embodiment of the invention. Referring to FIG. 4, the exemplary steps may begin with step 402 when a network device comprising MAC/PHY interfaces 114a and 114b is powered up. Subsequent to step 402, the exemplary steps may advance to step 404.

In step 404, if and when to power down one or more components of the network device may be determined based on an energy efficient networking (EEN) policy. Accordingly, it may be determined to power down all, or a portion of, the interface 114a and/or the interface 114b at a determined time instant. Accordingly, at the determined time instant, the exemplary step may advance to step 406.

In step 406, one or both of the interfaces 114a and 114b may be configured into an energy saving mode. However, in order to maintain synchronization between the interface 114a and the interface 114b, one of the techniques described herein may be utilized. In this regard, one or more clock signal generated may be altered while operating in the energy saving mode and/or dummy data may be generated while operating in the energy saving mode. Subsequent to step 406, the exemplary steps may advance to step 408.

In step 408, if and when to exit the energy saving mode may be determined based on an energy efficient networking (EEN) policy. Accordingly, it may be determined to power up all, or a portion of, the interface 114a and/or the interface 114b at a determined time instant. Accordingly, at the determined time instant the exemplary step may advance to step 410.

In step 410, one or both of the interfaces 114a and 114b may be reconfigured into a normal or high(er) power mode. In this regard, the interfaces 114a and 114b may become operable to communicated data between the Mac and PHY at a rate necessary to support the current activity of the network device. Subsequent to step 410, the exemplary steps may return to step 404.

Various aspects of a method and system for MAC and PHY synchronization for energy efficient networking are provided. In an exemplary embodiment of the invention, an interface 114 that enables communication between a MAC controller 108 and a PHY device 110 may be configured to operate in an energy saving mode. In one embodiment of the invention, the MAC controller 108, the PHY device 110, and the interface 114, which enables communication between the MAC controller 108 and the PHY device 110, may be within a communication device. While the interface 114 is operating in an energy saving mode, synchronization between the MAC controller 108 and the PHY device 110 may be maintained by one or both of: adjusting a clock generated for the interface 114 and/or communicating dummy data via the interface 114. The clock may be adjusted by one or more of: adjusting a frequency of the clock, adjusting an amplitude of the clock, and/or duty cycling the clock. The clock may be adjusted periodically or aperiodically over one or more time intervals. The interface 114 may be configured to operate in an energy saving mode at times determined by one or both of: a rate at which data is to be communicated by the interface 114 and/or an amount of data to be communicated by the interface 114. The amount of data to be communicated by the interface 114 may be determined based on a status of one or more queues in the PHY device and/or the MAC controller. The interface 114 may exit an energy saving mode when the interface 114 receives data from the MAC controller 108 and/or when the interface 114 receives data from the PHY device 110. The MAC controller 108 and/or the PHY device 110 may generate the dummy data. The PHY device 110 and/or the MAC controller 108 may discard the dummy data upon receiving the dummy data.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for MAC and PHY synchronization for energy efficient networking.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   transitioning a bus between a media access control device and a physical layer device from an active mode to an energy saving mode, wherein during said energy saving mode, a first part of a media access control device interface that is coupled to said bus and a first part of a physical layer device interface that is coupled to said bus are powered down; and while in said energy saving mode, operating a second part of said media access control device interface and/or a second part of said physical layer device interface in a powered mode that enables generation of an adjusted clock signal that is transmitted across said bus, said adjusted clock signal being used to maintain synchronization between said media access control device and said physical layer device, wherein said adjusted clock signal is generated by reducing a duty cycle of a clock to a non-zero duty cycle that is lower than a duty-cycle of said clock when said bus is in said active mode, wherein said adjusted clock signal has multiple periodic cycles in a first time period having a reduced frequency and/or amplitude, and a second time period where no clock signal is generated.

2. The method according to claim 1, wherein said adjusted clock signal is generated periodically.

3. The method according to claim 1, wherein said adjusted clock signal is generated aperiodically over one or more time intervals.

4. The method according to claim 1, wherein said adjusted clock signal is reduced in frequency.

5. The method according to claim 1, wherein said adjusted clock signal is reduced in amplitude.

6. The method according to claim 1, further comprising powering up said first part of said media access control device interface and said first part of said physical layer device interface when transitioning said bus from said energy saving mode to said active mode.

7. A system for networking, the system comprising:
one or more circuits for use in a communication device, said one or more circuits comprising a media access control device, a physical layer device, and a bus between said media access control device and said physical layer device, wherein said one or more circuits are configured to:
transition said bus between said media access control device and said physical layer device from an active mode to an energy saving mode, wherein during said energy saving mode, a first part of a media access control device interface that is coupled to said bus and a first part of a physical layer device interface that is coupled to said bus are powered down; and
while in said energy saving mode, operate a second part of said media access control device interface and/or a second part of said physical layer device interface in a powered mode that enables generation of an adjusted clock signal that is transmitted across said bus, said adjusted clock signal being used to maintain synchronization between said media access control device and said physical layer device, wherein said adjusted clock signal is generated by reducing a duty cycle of a clock to a non-zero duty cycle that is lower than a duty-cycle of said clock when said bus is in said active mode wherein adjusted clock signal has multiple period cycles in a first time period having a reduced frequency and/or amplitude, and a second time period where no clock signal is generated.

8. The system according to claim 7, wherein said adjusted clock signal is generated periodically.

9. The system according to claim 7, wherein said adjusted clock signal is generated aperiodically over one or more time intervals.

10. The system according to claim 7, wherein said adjusted clock signal is reduced in frequency.

11. The system according to claim 7, wherein said adjusted clock signal is reduced in amplitude.

12. The system according to claim 7, wherein said one or more circuits are configured to power up said first part of said media access control device interface and said first part of said physical layer device interface when transitioning said bus from said energy saving mode to said active mode.

13. A method, comprising:
transitioning a bus between a media access control device and a physical layer device from an active mode to an energy saving mode, wherein during said energy saving mode, a first part of a media access control device interface that is coupled to said bus and a first part of a physical layer device interface that is coupled to said bus are powered down; and
while in said energy saving mode, operating a second part of said media access control device interface and/or a second part of said physical layer device interface in a powered mode that enables generation of an adjusted clock signal that is transmitted across said bus, said adjusted clock signal being used to maintain synchronization between said media access control device and said physical layer device, wherein said adjusted clock signal has multiple periodic cycles in a first time period hang a reduced frequency and/or amplitude, and a second time period where no clock signal is generated.

14. The method according to claim 13, wherein said adjusted clock signal is reduced in frequency.

15. The method according to claim 13, wherein said adjusted clock signal is reduced in amplitude.

* * * * *

UNITED STATES PATENT AND TRADEMARK OFFICE
CERTIFICATE OF CORRECTION

PATENT NO. : 8,565,269 B2  Page 1 of 1
APPLICATION NO. : 12/415978
DATED : October 22, 2013
INVENTOR(S) : Wael William Diab It is certified that error appears in the above-identified patent and that said Letters Patent is hereby corrected as shown below:

In the Claims:

Col. 14, line 7, insert --said-- before "adjusted".

Col. 14, line 8, replace "period" with --periodic--.

Col. 14, line 42, replace "hang" with --having--.

Signed and Sealed this
Tenth Day of December, 2013

Margaret A. Focarino
*Commissioner for Patents of the United States Patent and Trademark Office*